US011637475B2

(12) United States Patent
Lemmers, Jr.

(10) Patent No.: US 11,637,475 B2
(45) Date of Patent: Apr. 25, 2023

(54) TERMINAL BLOCK FOR INTEGRATED TAIL CONE AND MOUNTED GENERATOR

(71) Applicant: Hamilton Sundstrand Corporation, Charlotte, NC (US)

(72) Inventor: Glenn C. Lemmers, Jr., Loves Park, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 583 days.

(21) Appl. No.: 16/812,801

(22) Filed: Mar. 9, 2020

(65) Prior Publication Data

US 2021/0281145 A1 Sep. 9, 2021

(51) Int. Cl.
*H02K 7/18* (2006.01)
*H02K 5/22* (2006.01)
*F02C 6/00* (2006.01)
*F01D 9/00* (2006.01)

(52) U.S. Cl.
CPC ............... *H02K 5/225* (2013.01); *H02K 7/18* (2013.01); *H02K 7/1823* (2013.01); *F01D 9/00* (2013.01); *F02C 6/00* (2013.01)

(58) Field of Classification Search
CPC ...... H02K 7/183; H02K 7/1838; H02K 5/225; H02K 7/1815; H02K 7/1823; H02K 7/18; F01D 15/10; F01D 25/24; F01D 9/00; F01D 9/065; F01D 25/243; F01D 25/30; F02C 6/00; F05D 2220/76
USPC ..................................................... 310/71, 89
See application file for complete search history.

(56) References Cited

U.S. PATENT DOCUMENTS

| 8,278,774 | B2 | 10/2012 | Macchia | |
| 8,829,702 | B1* | 9/2014 | Menheere | H02K 15/14 60/39.23 |
| 9,856,031 | B2 | 1/2018 | Tateiwa | |
| 9,892,826 | B2 | 2/2018 | Teshima et al. | |
| 10,207,814 | B2 | 2/2019 | Marks | |
| 2007/0217905 | A1* | 9/2007 | Bouiller | H02K 5/225 415/122.1 |
| 2017/0137143 | A1 | 5/2017 | Demelas | |
| 2017/0335795 | A1* | 11/2017 | Klemen | F01D 17/02 |

(Continued)

FOREIGN PATENT DOCUMENTS

EP 3553295 A1 10/2019

OTHER PUBLICATIONS

European Search Report for European Application No. 21156912.4, dated Jul. 27, 2021, 10 pages.

*Primary Examiner* — Alexander A Singh
(74) *Attorney, Agent, or Firm* — Cantor Colburn LLP

(57) ABSTRACT

Tail cone assemblies for gas turbine engines are described. The tail cone assemblies include a generator housing having an electrical connector, the generator housing defining a longitudinal axis. A first casing is arranged radially outward from the generator housing relative to the longitudinal axis and a second casing arranged radially outward from the first casing relative to the longitudinal axis. A hollow strut extends radially between the first casing and the second casing and defining an interior cavity, the hollow strut located circumferentially relative to the longitudinal axis at a location radially aligned with the electrical connector of the generator housing. An electrical conductor is arranged within the interior cavity of the hollow strut and an adapter is configured to electrically connect the electrical conductor with the electrical conductor.

18 Claims, 13 Drawing Sheets

(56) References Cited

U.S. PATENT DOCUMENTS

| | | | |
|---|---|---|---|
| 2018/0050806 A1* | 2/2018 | Kupiszewski | F02C 7/32 |
| 2020/0063606 A1* | 2/2020 | Miller | F01D 25/28 |
| 2020/0290744 A1 | 9/2020 | Spierling | |
| 2020/0291810 A1 | 9/2020 | Spierling | |
| 2020/0291890 A1 | 9/2020 | Spierling | |
| 2022/0049648 A1* | 2/2022 | Hughes | F02C 7/275 |

* cited by examiner

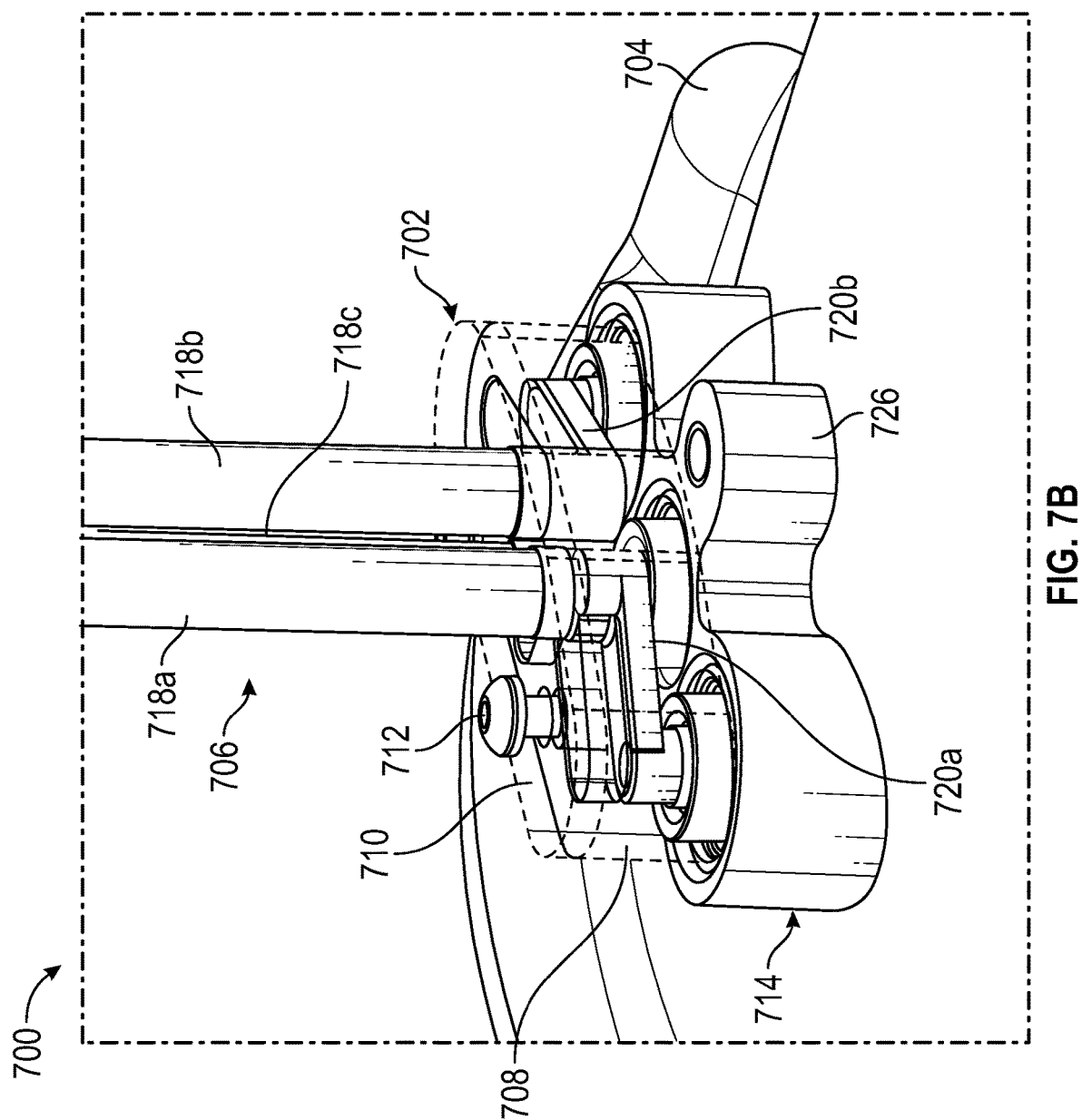

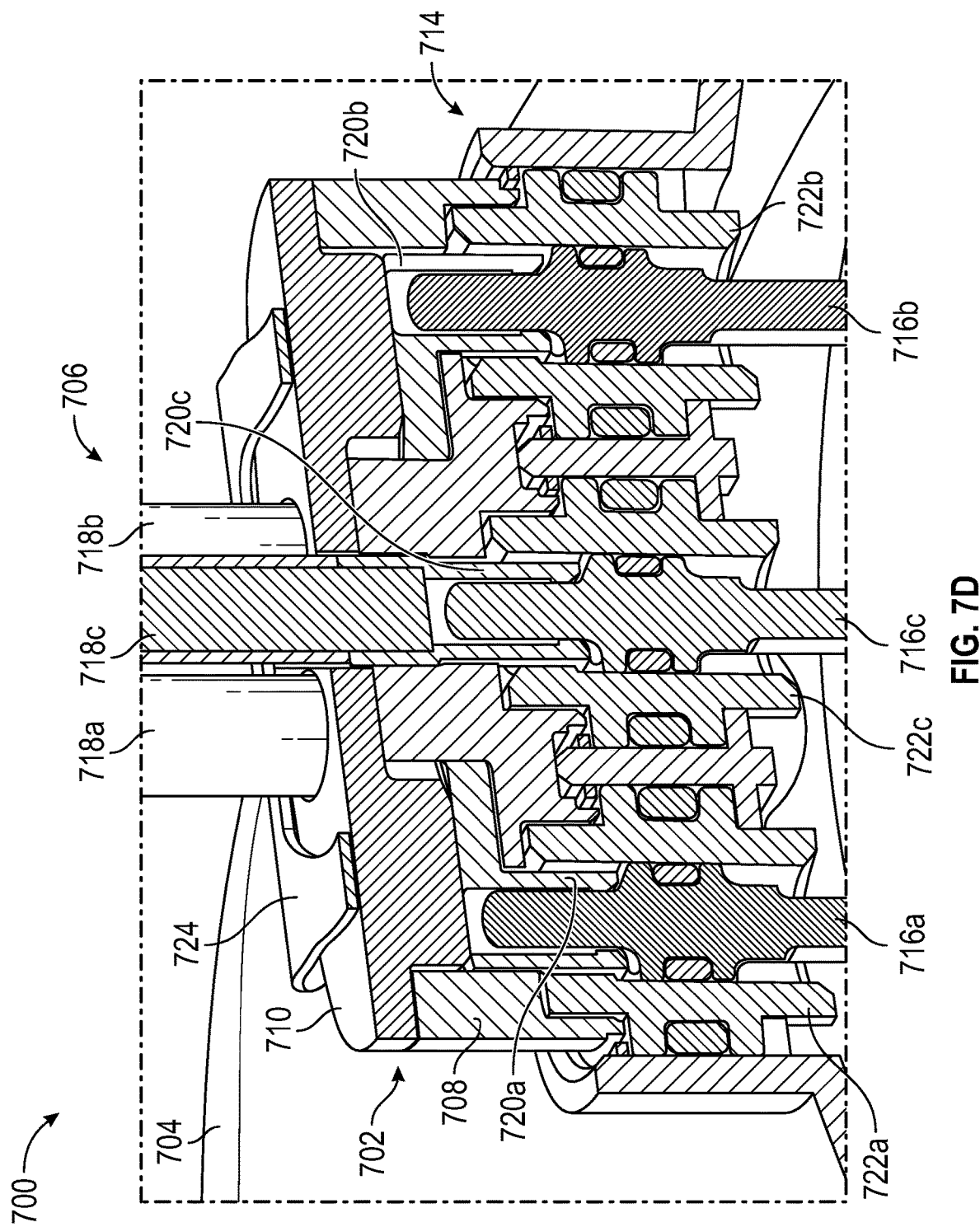

TERMINAL BLOCK FOR INTEGRATED TAIL CONE AND MOUNTED GENERATOR

BACKGROUND

The subject matter disclosed herein generally relates to gas turbine engines, and more specifically to electric generators for gas turbine engines.

Conventional gas turbine engines are often tight on free space due to envelope constraints. Therefore innovative space-saving designs and architectures are often sought out when integrating new components into the gas turbine engine.

BRIEF SUMMARY

According to some embodiments, tail cone assemblies are provided. The tail cone assemblies include a generator housing having an electrical connector, the generator housing defining a longitudinal axis, a first casing arranged radially outward from the generator housing relative to the longitudinal axis, and a second casing arranged radially outward from the first casing relative to the longitudinal axis. A hollow strut extends radially between the first casing and the second casing and defining an interior cavity, the hollow strut located circumferentially relative to the longitudinal axis at a location radially aligned with the electrical connector of the generator housing. An electrical conductor is arranged within the interior cavity of the hollow strut and an adapter is configured to electrically connect the electrical conductor with the electrical connector of the generator housing.

In addition to one or more of the features described above, or as an alternative, further embodiments of the tail cone assemblies may include that the adapter is arranged within the interior cavity of the hollow strut.

In addition to one or more of the features described above, or as an alternative, further embodiments of the tail cone assemblies may include an electric generator installed within the generator housing.

In addition to one or more of the features described above, or as an alternative, further embodiments of the tail cone assemblies may include that the electrical conductor is a three-phase electrical conductor having three wires.

In addition to one or more of the features described above, or as an alternative, further embodiments of the tail cone assemblies may include that the electrical connector comprises three electrical pins and the adapter comprises three bus bars arranged to each connect one of the three wires to one of the three electrical pins.

In addition to one or more of the features described above, or as an alternative, further embodiments of the tail cone assemblies may include at least one additional hollow strut extending radially between the first casing and the second casing and defining an interior cavity, the at least one additional hollow strut located circumferentially relative to the longitudinal axis at a location radially aligned with at least one additional electrical connector of the generator housing. At least one additional electrical conductor is arranged within the interior cavity of the at least one additional hollow strut and at least one additional adapter is configured to electrically connect the at least one additional electrical conductor with the at least one additional electrical conductor.

In addition to one or more of the features described above, or as an alternative, further embodiments of the tail cone assemblies may include a bracket configured to fixedly attach the adapter to the generator housing.

In addition to one or more of the features described above, or as an alternative, further embodiments of the tail cone assemblies may include that the adapter comprises an adapter body and an adapter cover.

In addition to one or more of the features described above, or as an alternative, further embodiments of the tail cone assemblies may include that the adapter body is configured to directly connect to the generator housing.

In addition to one or more of the features described above, or as an alternative, further embodiments of the tail cone assemblies may include that the adapter body and the adapter cover are electrically insulating.

According to some embodiments, gas turbine engines are provided. The gas turbine engines include a low spool shaft arranged along an engine longitudinal axis and a tail cone assembly. The tail cone assembly includes a generator housing having an electrical connector, the generator housing defining a longitudinal axis aligned with the engine longitudinal axis, a first casing arranged radially outward from the generator housing relative to the longitudinal axis, a second casing arranged radially outward from the first casing relative to the longitudinal axis, and a hollow strut extending radially between the first casing and the second casing and defining an interior cavity, the hollow strut located circumferentially relative to the longitudinal axis at a location radially aligned with the electrical connector of the generator housing. An electrical conductor is arranged within the interior cavity of the hollow strut and an adapter is configured to electrically connect the electrical conductor with the electrical connector of the generator housing.

In addition to one or more of the features described above, or as an alternative, further embodiments of the gas turbine engines may include an electric generator installed within the generator housing, wherein the electric generator is operably connected to the low spool shaft.

In addition to one or more of the features described above, or as an alternative, further embodiments of the gas turbine engines may include that the adapter is arranged within the interior cavity of the hollow strut.

In addition to one or more of the features described above, or as an alternative, further embodiments of the gas turbine engines may include that the electrical conductor is a three-phase electrical conductor having three wires.

In addition to one or more of the features described above, or as an alternative, further embodiments of the gas turbine engines may include a third casing arranged radially outward from the second casing relative to the longitudinal axis, wherein a space between the first casing and the second casing is a core flow exhaust area and a space between the second casing and the third casing is a bypass flow exhaust are.

In addition to one or more of the features described above, or as an alternative, further embodiments of the gas turbine engines may include at least one additional hollow strut extending radially between the first casing and the second casing and defining an interior cavity, the at least one additional hollow strut located circumferentially relative to the longitudinal axis at a location radially aligned with at least one additional electrical connector of the generator housing, at least one additional electrical conductor arranged within the interior cavity of the at least one additional hollow strut, and at least one additional adapter configured to electrically connect the at least one additional electrical conductor with the at least one additional electrical conductor.

In addition to one or more of the features described above, or as an alternative, further embodiments of the gas turbine engines may include at least one additional hollow strut extending radially between the first casing and the second casing and defining an interior cavity, the at least one additional hollow strut located circumferentially relative to the longitudinal axis at a location radially aligned with a fluid connector of the generator housing and at least one fluid line connected to the fluid connector and passing through the at least one additional hollow strut.

In addition to one or more of the features described above, or as an alternative, further embodiments of the gas turbine engines may include that the at least one fluid line is one of an oil input line, an air input line, and an oil scavenge line.

In addition to one or more of the features described above, or as an alternative, further embodiments of the gas turbine engines may include a bracket configured to fixedly attach the adapter to the generator housing.

In addition to one or more of the features described above, or as an alternative, further embodiments of the gas turbine engines may include a tail cone arranged with the generator housing positioned within the tail cone.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 7B illustrates a partial transparent illustration of the adapter of FIG. 7A as connected to an electrical conductor of the generator housing;

FIG. 7D is a cross-sectional illustration of the adapter of FIG. 7A as viewed along the line D-D of FIG. 7C.

DETAILED DESCRIPTION

A detailed description of one or more embodiments of the disclosed apparatus and method are presented herein by way of exemplification and not limitation with reference to the Figures.

High pressure spools of gas turbine engines may be used to drive accessories of the gas turbine engine. However, as engine bypass ratios increase, the capability of a high pressure spool to drive accessories, such as electric generators, has been diminished. Therefore it is desirable to drive accessories off of a low pressure spool of the gas turbine engine. Gas turbine engines typically drive accessories through a radial tower shaft and accessory gearbox operably connected to the high pressure spool, however connecting to the low pressure spool is more challenging.

Gas turbines may also include a tail cone at the rear of the engine to help accelerate the exhaust flow and create additional thrust. The enclosed area within this tail cone is typically empty space, and is also adjacent to the rotating low pressure spool. Embodiments disclosed herein seek to take advantage of this empty space by locating an electric generator within the tail cone and operably connecting the electric generator to the low speed spool such that the electric generator is driven by the low speed spool. Supplying electricity generated by such electric generator to various other engine and/or aircraft systems requires a terminal block to connect electrical wires or conductors and/or other conduits or connectors (e.g., for cooling air and/or fluids). However, given the relatively small amount of space, and high temperature gas exiting the engine, the availability of using convention terminal blocks is very limited (i.e., such terminal blocks may not fit within and around the tail cone at the aft end of the engine).

Figure 1:
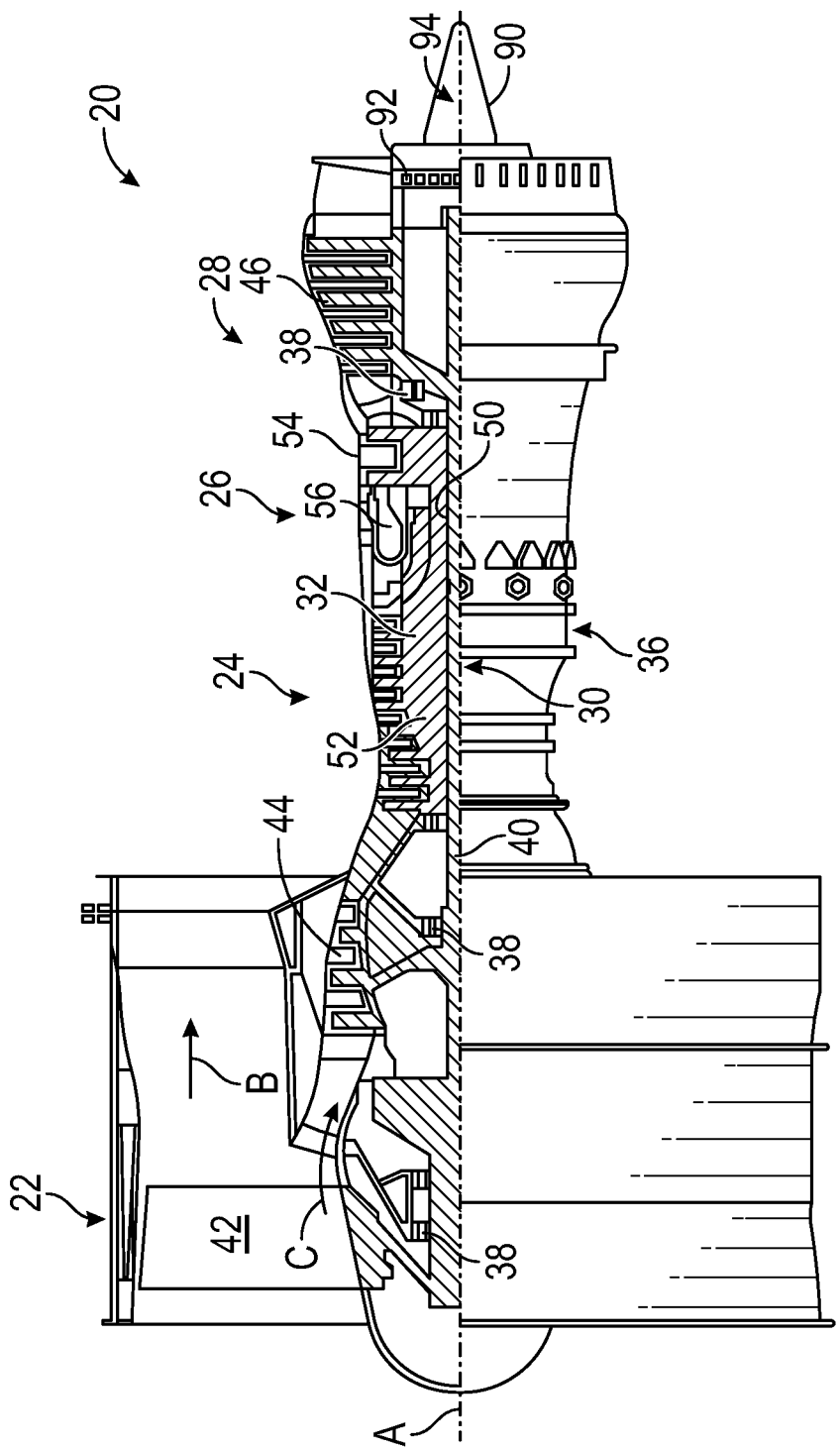
FIG. 1 is a partial cross-sectional illustration of an example gas turbine engine that may incorporate embodiments of the present disclosure.

FIG. 1 schematically illustrates an example gas turbine engine 20 that may incorporate embodiments of the present disclosure. The gas turbine engine 20 is disclosed herein as a two-spool turbofan that includes, as illustrated, a fan section 22, a compressor section 24, a combustor section 26, and a turbine section 28. The fan section 22 is configured to drive air along a bypass flow path B in a bypass duct, while the compressor section 24 is configured to drive air along a core flow path C for compression and communication into the combustor section 26, expansion through the turbine section 28, and exhausted out an aft end of the gas turbine engine 20. Although depicted as a two-spool turbofan gas turbine engine in the disclosed non-limiting embodiment, it should be understood that the concepts described herein are not limited to use with two-spool turbofans as the teachings may be applied to other types of turbine engines, without departing from the scope of the present disclosure.

The gas turbine engine 20, shown in FIG. 1, includes a low speed spool 30 and a high speed spool 32 mounted for rotation about an engine central longitudinal axis A relative to an engine static structure 36 via several bearing systems 38. It should be understood that additional and/or alternative bearing systems, such as at various different locations, may be provided and the location of the bearing systems 38 may be varied as appropriate to the application.

The low speed spool 30, as shown, includes an inner shaft 40 that interconnects a fan 42, a low pressure compressor 44, and a low pressure turbine 46. The fan 42 may be driven at a lower speed than the low speed spool 30. The high speed spool 32 includes an outer shaft 50 that interconnects a high pressure compressor 52 and a high pressure turbine 54. A combustor 56 is arranged in the gas turbine 20 between the high pressure compressor 52 and the high pressure turbine 54. The engine static structure 36 is arranged generally between the high pressure turbine 54 and the low pressure turbine 46. The engine static structure 36 is configured to support the bearing systems 38 in the turbine section 28. The inner shaft 40 and the outer shaft 50 are concentric and rotate via the bearing systems 38 about the engine central longitudinal axis A, which is collinear with their longitudinal axes.

The air of the core flow path C is compressed by the low pressure compressor 44 then the high pressure compressor 52, mixed and burned with fuel in the combustor 56, then expanded over the high pressure turbine 54 and the low pressure turbine 46. The turbine section 28 rotationally drives the respective low speed spool 30 and high speed spool 32 in response to the expansion. It will be appreciated that each of the positions of the fan section 22, the compressor section 24, the combustor section 26, and the turbine section 28 may be varied, depending on the specific engine configuration and/or application.

As shown, the gas turbine engine 20 includes a tail cone 90 located on a rear or aft portion of the gas turbine engine 20. The tail cone 90 is operably shaped to help accelerate the exhaust air flow exiting the core flow path C and configured to create additional thrust for the gas turbine engine 20. Commonly, the tail cone 90 may be securely fastened to the gas turbine engine 20 via a plurality of fasteners 92 and/or struts to one or more structural parts of the gas turbine engine 20. The structural parts of the gas turbine engine 20 to which the tail cone 90 may attach may be the engine static structure 36. The plurality of fasteners 92 may be arranged circumferentially around the engine central longitudinal axis A. The tail cone 90 may be securely fastened to the gas turbine engine 20 in a cantilevered arrangement, as shown in FIG. 1. The tail cone 90 may include or define a hollow interior space 94 within the tail cone 90. Conventional gas turbine engines typically leave this interior space empty and unused. However, in accordance with embodiments disclosed herein, this interior space 94 may be utilized by locating an electric generator within the interior space 94.

When mounting the electric generator within the interior space of a tail cone, the connectors for the electric generator must enable connection from the generator to other engine and/or aircraft systems. Such electric generator may require fluid inputs (e.g., air and/or liquid) for the purpose of cooling and lubrication (can include input and output conduits). Further, the electricity must be directed along electrical conductors to deliver the electricity to one or more desired locations (e.g., on the gas turbine or elsewhere on the aircraft). Conventional terminal blocks are not suitable for use in this tail cone configuration. This is because conventional terminal blocks are too large and cannot fit within the space at the tail cone.

Figure 2:
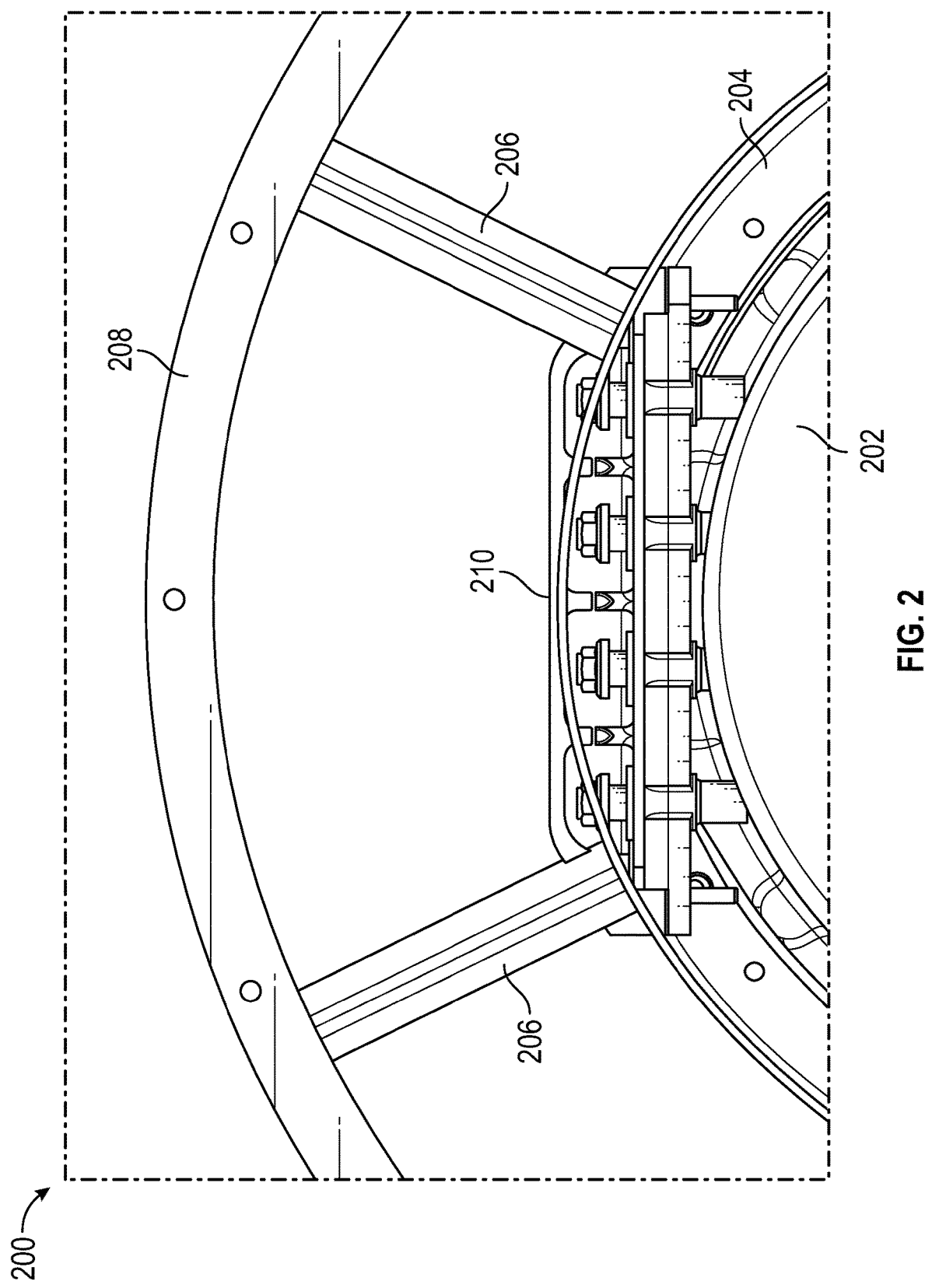
FIG. 2 is a schematic illustration of tail cone assembly.

For example, turning to FIG. 2, a tail cone assembly 200 is shown. The tail cone assembly 200 is configured to house an electric generator within a generator housing 202. The generator housing 202 is supported within a gas turbine engine by a first casing 204. As shown, struts 206 extend between the first casing 204 and a second casing 208. The space between the first casing 204 and the second casing may define the hot gas exhaust from the gas turbine engine (e.g., core flow path C shown in FIG. 1). Although not shown, a third casing may be arranged radially outward from the second casing, with the space between the second casing 208 and the third casing defining an exhaust of bypass air (e.g., bypass flow path B shown in FIG. 1).

Also shown in FIG. 2 is a terminal block 210. The terminal block 210, as shown, cannot fit within a reasonable space around the generator housing 202, and thus is shown extending through the first casing 204 and into the exhaust area of the core flow path. Furthermore, as shown, cabling for electrical connections is not viable either, as such cables would need to extend through and be exposed to the hot exhaust gases. This is due in part to the relatively narrow or small area in which the generator housing 202 is installed, and also due in part to the relatively small circumference of the generator housing 202. That is, the generator housing 202 does not provide sufficient surface area for the proper installation and use of the terminal block 210, as shown.

In view of this, embodiments of the present disclosure are directed to improved systems and configurations that allow for the use of a tail cone-mounted electric generator and electrical connections thereto.

Figure 3A:
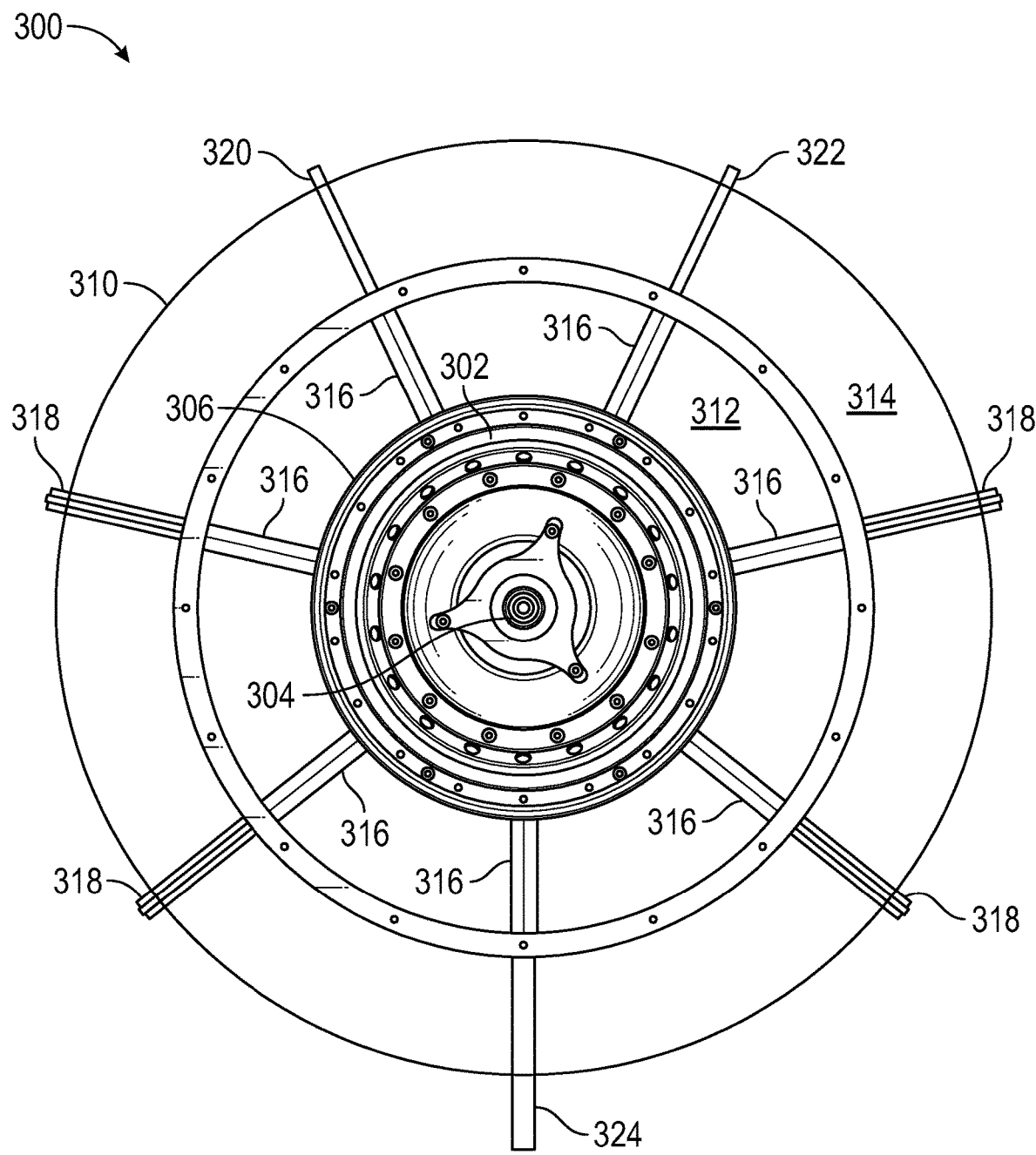
FIG. 3A is an aft-facing view of a tail cone assembly in accordance with an embodiment of the present disclosure.
Figure 3B:
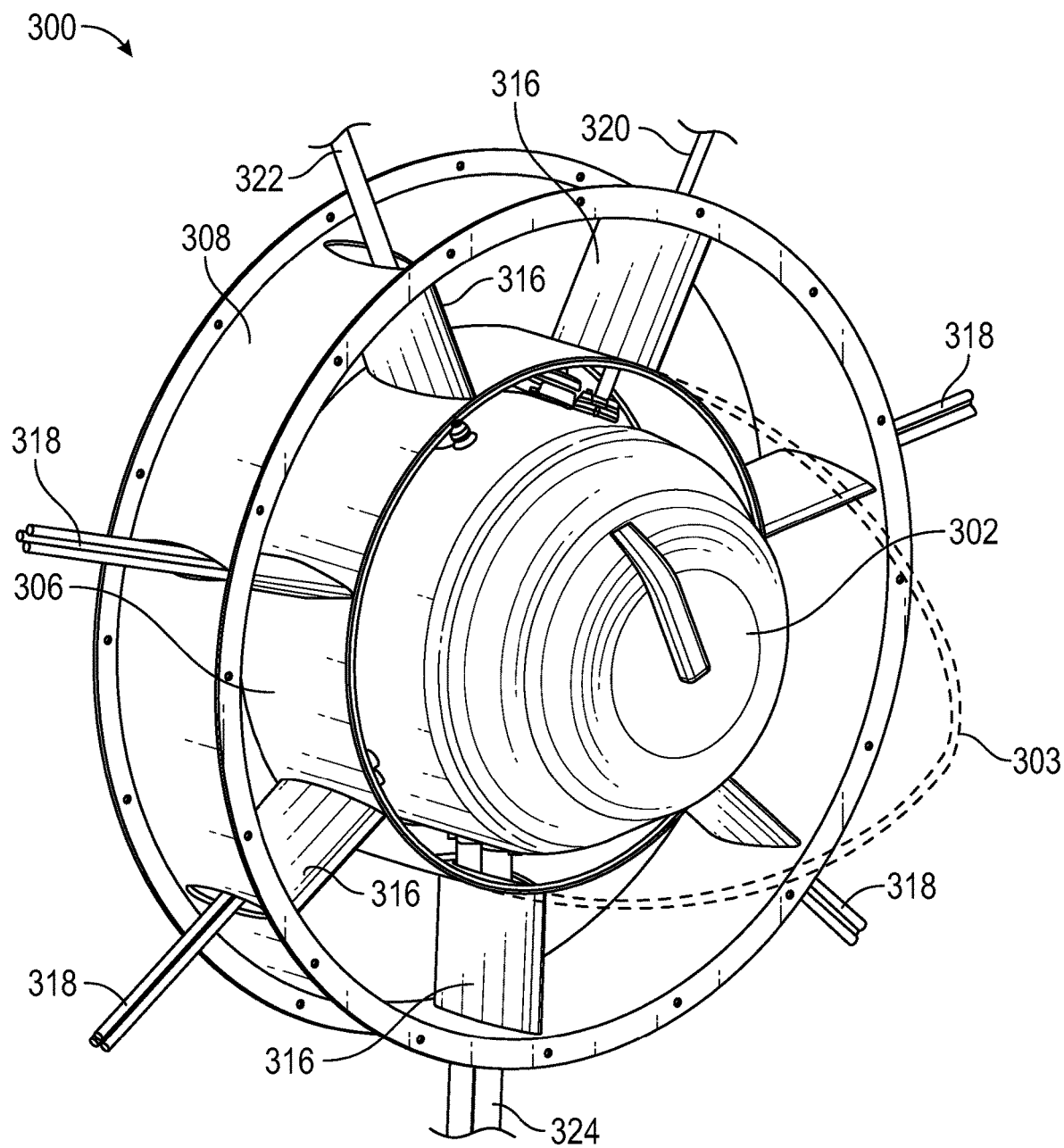
FIG. 3B is a forward-facing isometric illustration of the tail cone assembly of FIG. 3A.
Figure 3C:
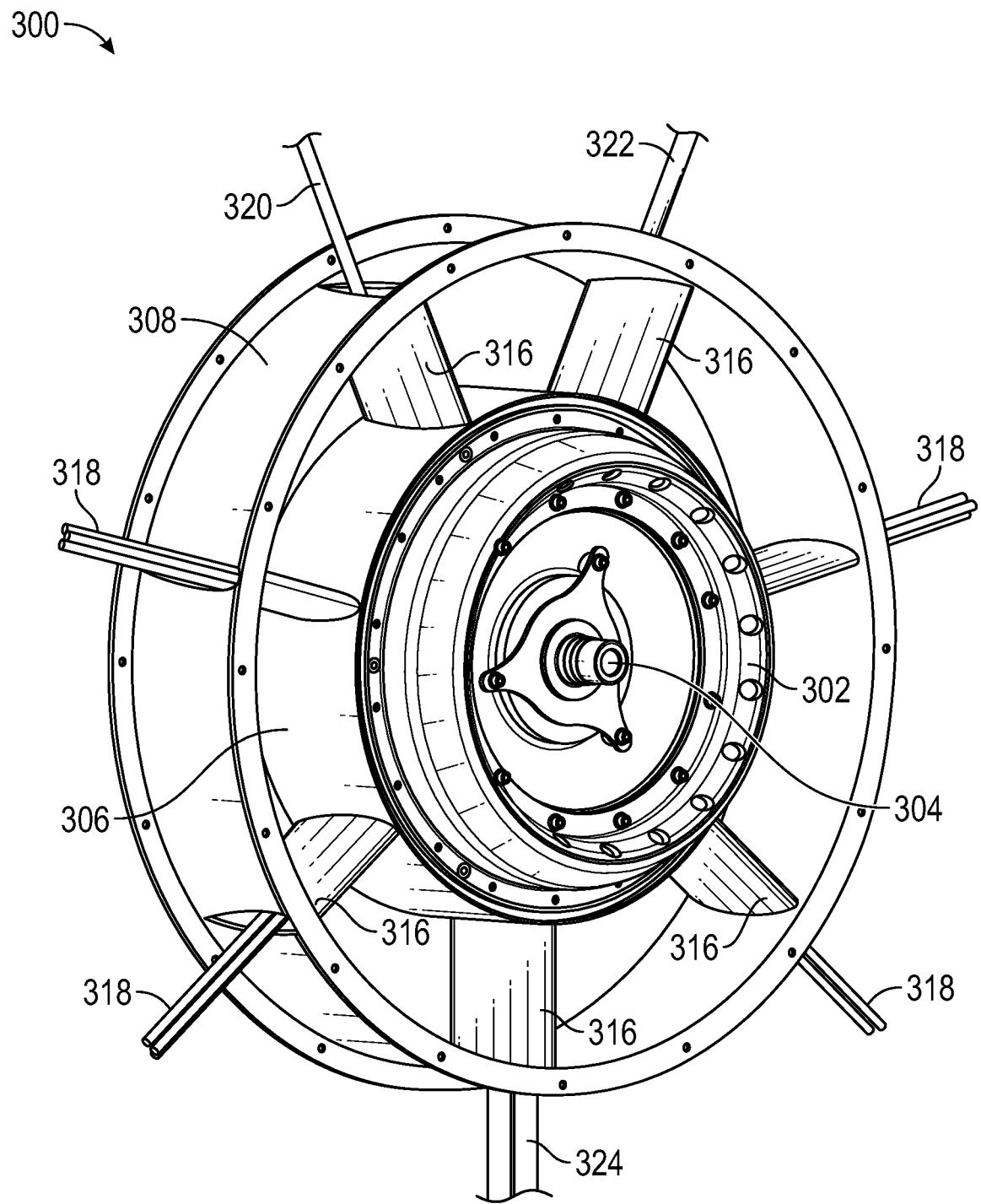
FIG. 3C is an aft-facing isometric illustration of the tail cone assembly of FIG. 3A.

Turning now to FIGS. 3A-3C, schematic illustrations of a tail cone assembly 300 in accordance with an embodiment of the present disclosure are shown. FIG. 3A is an aft-facing view of the tail cone assembly 300, FIG. 3B is a forward-facing isometric illustration of the tail cone assembly 300, and FIG. 3C is an aft-facing isometric illustration of the tail cone assembly 300. The tail cone assembly 300 includes an electric generator installed within a generator housing 302 that is arranged within a tail cone 303 and along an axis of a gas turbine engine, with the electric generator having an input shaft 304 that is configured to operably connect to a low spool of the gas turbine engine. The low spool of the gas turbine engine may be configured to drive operation of the electric generator to generate power which may be distributed to other systems of the gas turbine engine and/or of an aircraft.

The generator housing 302 is mounted within a first casing 306 of the gas turbine engine. Radially outward from the first casing 306 is a second casing 308, and radially outward from the second casing 308 is a third casing 310 (shown in FIG. 3A). The space between the first casing 306 and the second casing 308 defines an core exhaust area 312 of a core flow path through the gas turbine engine and space between the second casing 308 and the third casing 310 defines a bypass exhaust area 314 of a bypass flow path, as shown in FIG. 3A. As shown, a plurality of hollow struts 316 extend between the first casing 306 and the second casing 308. Although not show, similar hollow struts may be provided between the second casing 308 and the third casing 310. In this configuration, the first casing 306 is an inner casing, the second casing 308 is a middle casing, and the third casing 310 is an outer casing, with each casing description made relative to a radial line extending from an engine axis.

The electric generator housed within the generator housing 302 can be operably connected to other systems using one or more types of conduits, cables, and/or connectors. For example, in this non-limiting example embodiment, the electric generator has four sets of electrical conductors 318 operably (and electrically) connected thereto along with an oil input line 320, an air input line 322, and an oil scavenge line 324. As shown, the tail cone assembly 300 includes seven hollow struts 316. The hollow struts 316 are arranged circumferentially about or relative to the generator housing 302 at specific locations and aligned therewith, as described herein. For example, as shown, four of the hollow struts 316 are configured to contain and protect the electrical conductors 318, one hollow strut 316 each is used to contain and protect the oil input line 320, the air input line 322, and the oil scavenge line 324. As such, each of the electrical conductors 318, the oil input line 320, the air input line 322, and the oil scavenge line 324 may pass through the core exhaust area 312 without being directly, and adversely, impacted thereby. Moreover, such elements are housed such that they are contained within substantially aerodynamic structures (i.e., the hollow struts 316), and thus do not adversely impact the exhaust stream efficiencies. The circumferential position or location of the hollow struts allows for an easy installation of the internal components and ease of connection and/or interfacing with the generator housing 302 and/or elements/structures housed within the generator housing 302. This is achieved, in part, for example, due to the circumferential alignment of the hollow struts with a connector on the generator housing.

It will be noted that in FIGS. 3A-3C, the electrical conductors 318, the oil input line 320, the air input line 322, and the oil scavenge line 324 pass through the bypass exhaust area 314. This configuration is not to be limiting. For example, due to the lower temperatures within the bypass exhaust area 314, it may be possible to run one or more of the electrical conductors 318, the oil input line 320, the air input line 322, and the oil scavenge line 324 along an exterior surface of the second casing 308 (e.g., a surface facing the third casing 310). Such configuration may have one or more of the electrical conductors 318, the oil input line 320, the air input line 322, and the oil scavenge line 324 extending axially along the second casing 308 (i.e., in-and-out of the page of FIG. 3A). As such, the illustrative configuration is not to be limiting, but rather is merely for illustrative and explanatory purposes.

In this illustrative configuration, as noted, there are four electrical conductors 318 that electrically connect to the electric generator within the generator housing 302. The four electrical conductors 318 are configured to securely engage with, and electrically engage with, respective terminal posts arranged on the exterior of the generator housing 302. As described further below, the terminal posts are arranged at locations on the exterior of the generator housing 302 such that when installed into a gas turbine engine, the terminal posts will align with the hollow struts 316. As such, the electrical conductors 318 may pass directly through the hollow struts 316 and electrically connect with the terminal posts. As illustratively shown in FIGS. 3A-3C, the electrical conductors 318 are formed of a group of three wires or cables. Each wire or cable of the electrical conductors 318 may be arranged as one of A, B, or C Phase, such that at each terminal post a set of A, B, C Phases are connected to the electric generator housed within the generator housing 302.

Figure 4:
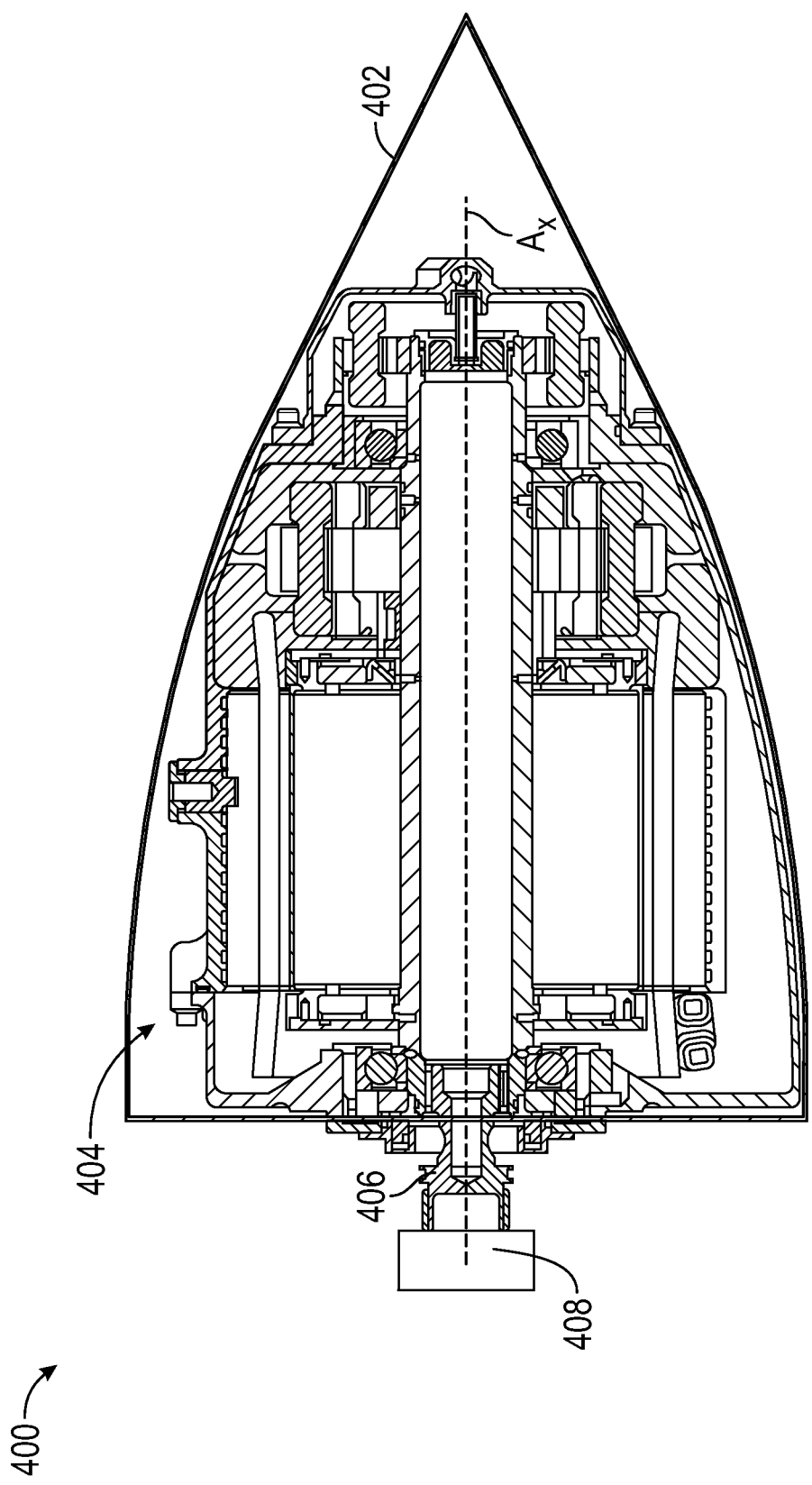
FIG. 4 is a schematic cross-sectional illustration of a tail cone assembly in accordance with an embodiment of the present disclosure.

Turning now to FIG. 4, a schematic cross-sectional illustration of a tail cone assembly 400 in accordance with an embodiment of the present disclosure is shown. FIG. 4 illustrates a generator housing 402 with an electric generator 404 installed therein. The electric generator 404 includes an input shaft 406 that operably connects to a low spool shaft 408 of a gas turbine engine and is arranged along a longitudinal axis $A_x$ of the generator housing 402. When installed within a gas turbine engine, the longitudinal axis $A_x$ of the generator housing 402 will align with the engine longitudinal axis. Other examples of such electric generators are disclosed in: U.S. patent application Ser. No. 16/354,357, filed Mar. 15, 2019, entitled "Integrated Tail Cone and Mounted Generator;" U.S. patent application Ser. No. 16/354,310, filed Mar. 15, 2019, entitled "Temperature Control Device for Tail Cone Mounted Generator;" U.S. patent application Ser. No. 16/354,335, filed Mar. 15, 2019, entitled "Plug In Fluid Cooled Electrical Connections for Tail Cone Mounted Generator." The contents of these prior filed and commonly owned Applications are incorporated into the present disclosure in their entireties.

Figure 5A:
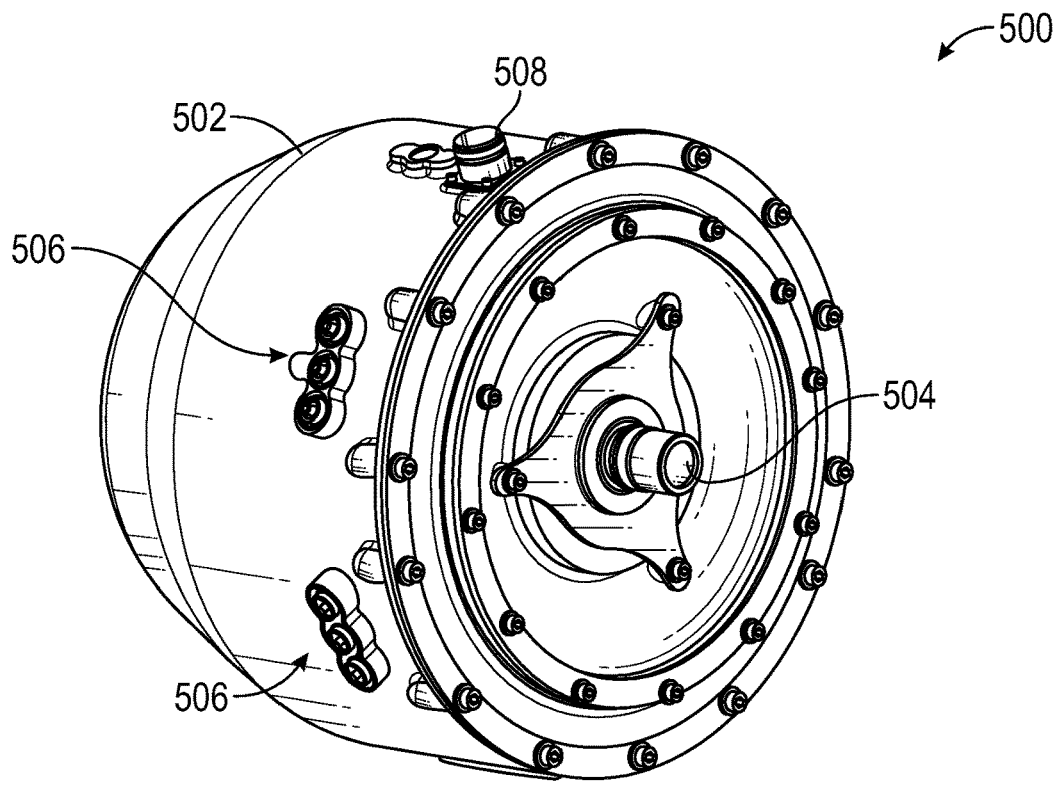
FIG. 5A is an aft-facing isometric view of a tail cone assembly without electrical connections in accordance with an embodiment of the present disclosure.
Figure 5B:
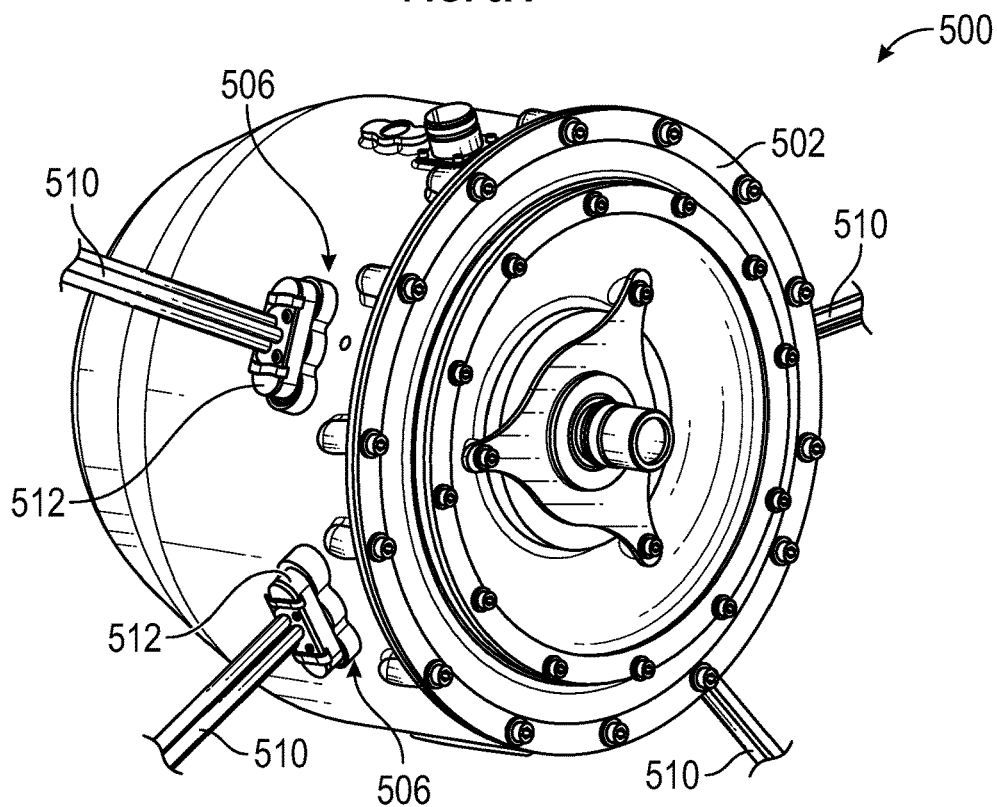
FIG. 5B is an aft-facing isometric illustration of the tail cone assembly of FIG. 5A illustrating electrical connections connected thereto.
Figure 5C:
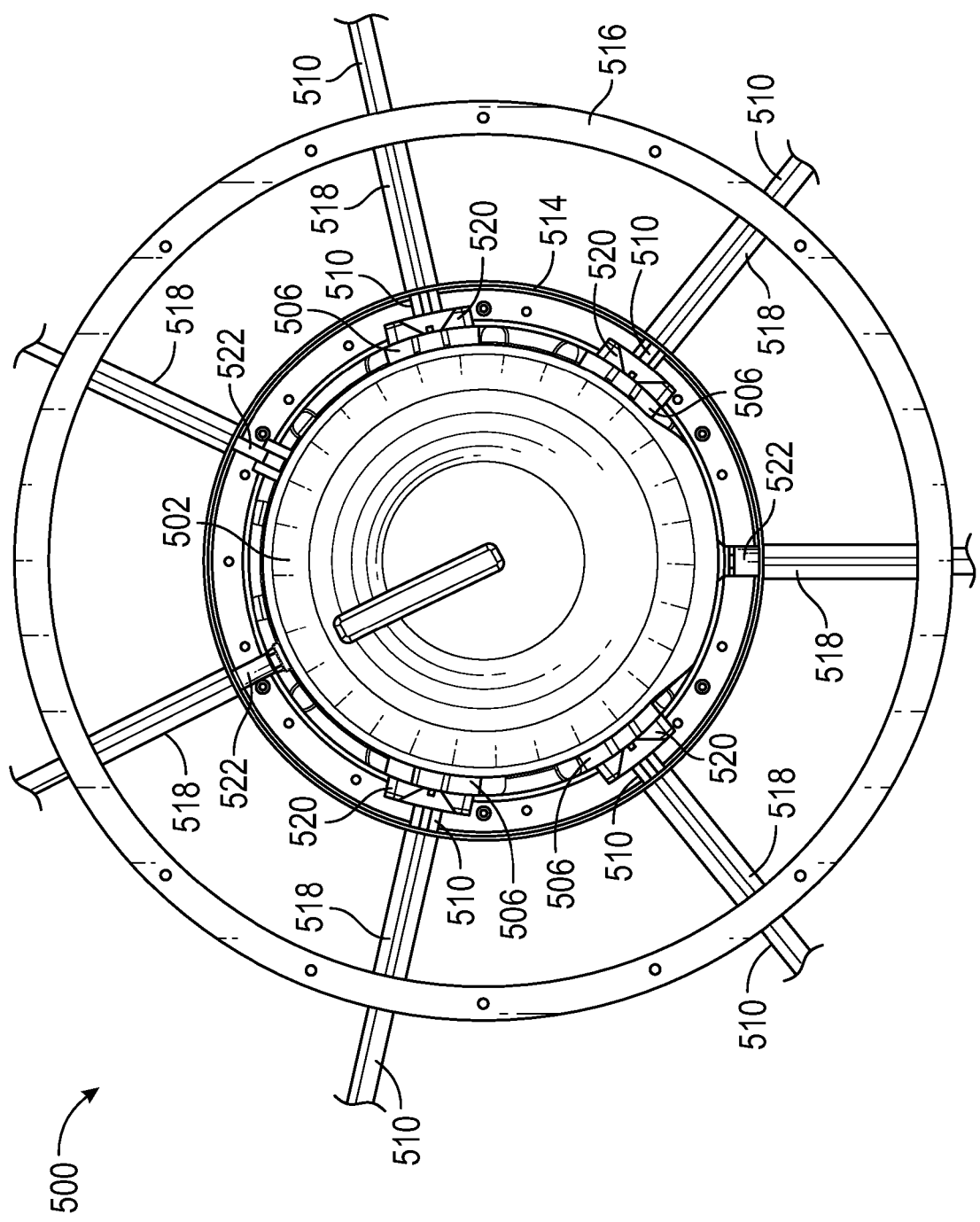
FIG. 5C is a forward-facing illustration of the tail cone assembly of FIG. 5A as installed within a portion of a gas turbine engine.

Turning now to FIGS. 5A-5C, schematic illustrations of a tail cone assembly 500 in accordance with an embodiment of the present disclosure are shown. FIG. 5A is an aft-facing isometric view of the tail cone assembly 500 without electrical connections, FIG. 5B is an aft-facing isometric illustration of the tail cone assembly 500 with electrical connections shown, and FIG. 5C is a forward-facing illustration of the tail cone assembly 500 as installed within a portion of a gas turbine engine. The tail cone assembly 500 includes an electric generator installed within a generator housing 502 that is arranged along an axis of a gas turbine engine, with the electric generator having an input shaft 504 that is configured to operably connect to a low spool of the gas turbine engine. The low spool of the gas turbine engine may be configured to drive operation of the electric generator to generate power which may be distributed to other systems of the gas turbine engine and/or of an aircraft.

As shown in FIGS. 5A-5B, the generator housing 502 includes a plurality of different connectors. For example, the generator housing 502 includes a number of electrical connectors 506 (e.g., terminal posts), and as shown are arranged as sets of three wires or cables (e.g., A, B, C, phases). Further, the generator housing 502 includes one or more fluid connectors 508 which can provide for fluid connection to one or more sources of fluid (e.g., oil inlet, air inlet, scavenge outlet, etc.). FIG. 5B illustrates electrical conductors 510 that connect to the electrical connectors 506 by a respective adapter 512. The adapters 512 are configured to receive the electrical conductors 510 and provide for an electrical interface between the electrical conductors 510 and the electric generator housed within the generator housing 502. As such, the adapters 512 may be considered terminal blocks of the system.

The adapters 512 can provide fixed connection between the electrical conductors 510 and a respective electrical connector 506 of the generator housing 502. The adapters 512 are configured to enable both physical and electrical connection between the electrical conductors 510 and a respective electrical connector 506.

FIG. 5C illustrates the tail cone assembly 500 with the generator housing 502 and interior electric generator installed relative to casings of a gas turbine engine. For example, as shown, the generator housing 502 is installed radially inward from a first casing 514, which in turn is arranged radially inward from a second casing 516, similar to that shown and described above. A number of hollow struts 518 are arranged to connect the first casing 514 to the second casing 516. As shown, the electrical conductors 510 are arranged to pass through the hollow struts 518 from the second casing 516 to the first casing 514 and to engage with a respective electrical connector 506. An adapter 520 is arranged between each electrical conductor 510 and a respective electrical connector 506 to enable electrical connection between the electrical conductors 510 and the electric generator installed and housed within the generator housing 502. Also shown in FIG. 5C, various fluid lines 522 are installed through respective hollow struts 518 to provide for fluid connections with the electric generator installed and housed within the generator housing 502. Such fluid lines 522 may provide for inlets and/or outlets for fluids such as, without limitation, oil and air.

Figure 6A:
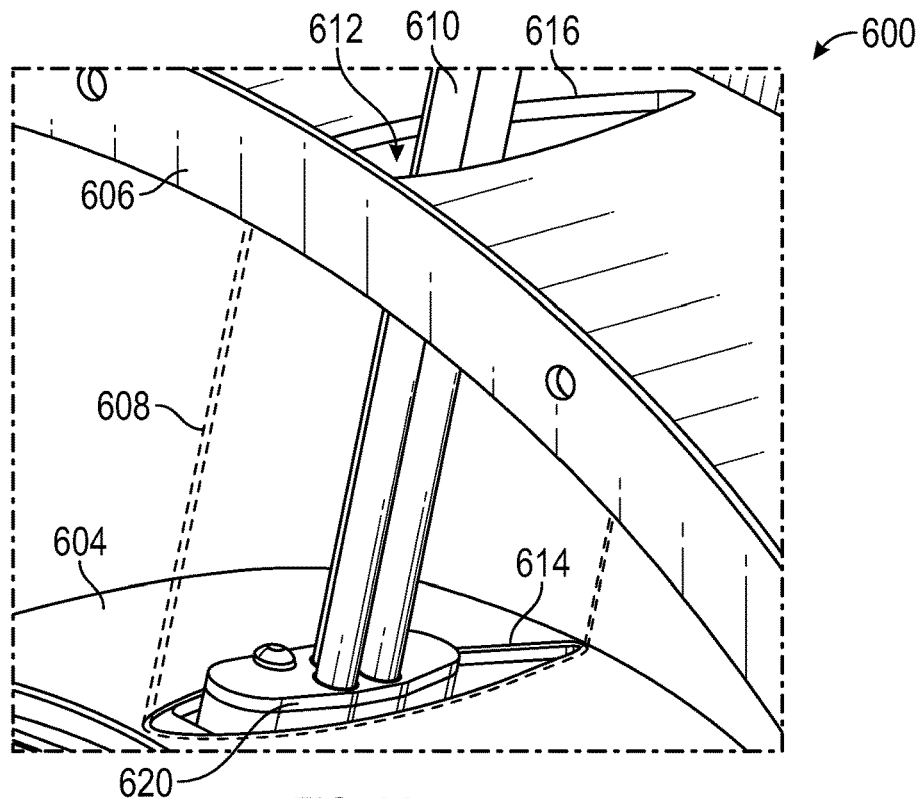
FIG. 6A illustrates a partially transparent isometric illustration of a portion of a tail cone assembly in accordance with an embodiment of the present disclosure.
Figure 6B:
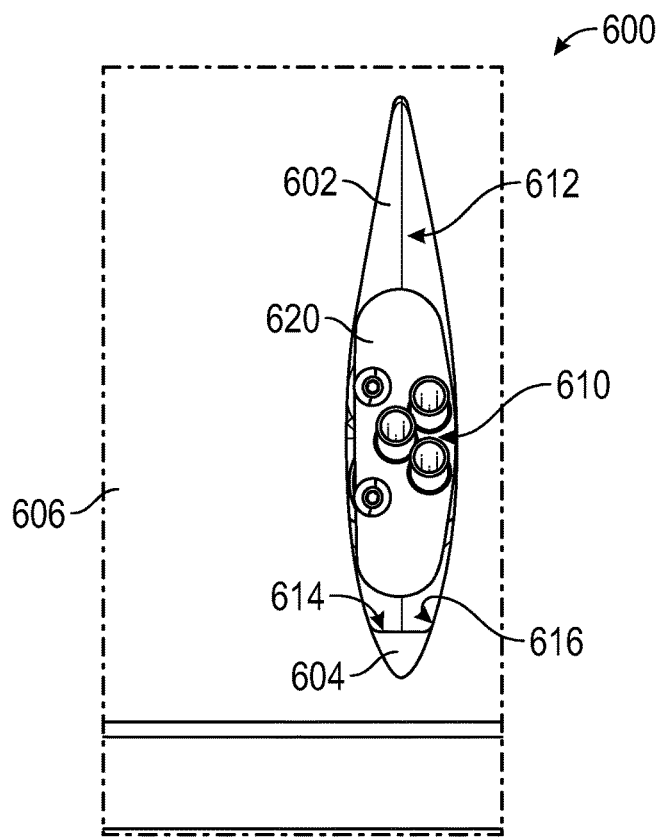
FIG. 6B is a radially inward view of the portion of the tail cone assembly shown in FIG. 6A.

Turning now to FIGS. 6A-6B, schematic illustrations of a part of a tail cone assembly 600 in accordance with an embodiment of the present disclosure are shown. FIG. 6A illustrates a partially transparent isometric illustration of a portion of the tail cone assembly 600 and FIG. 6B is a radially inward view of the portion of the tail cone assembly 600. The tail cone assembly 600 may be similar to that shown and described above. In the view of FIG. 6B, a generator housing 602 is shown radially inward from an first casing 604 and a second casing 606, similar to that shown and described above. A hollow strut 608 extends between the first casing 604 and the second casing 606.

As shown, an electrical conductor 610 passes through the hollow strut 608. The electrical conductor 610 in these illustrations comprises three separate wires or cables, and may be configured as a three-phase electrical conductor. The hollow strut 608 defines an interior cavity 612 that openly connects to a first casing opening 614 of the first casing 604 and to a second casing opening 616 of the second casing 606. As such, an open path or conduit is defined between the first casing 604 and the second casing 606 through which the electrical conductor 610 can pass. As shown, an adapter 620 is arranged to fit within the interior cavity 612 of the hollow strut 608 and within the first casing opening 614 of the first casing 604. The adapter 620 provides for an electrical interface or connection between the electrical conductor 610 and an electrical connector of the generator housing 602.

Figure 7A:
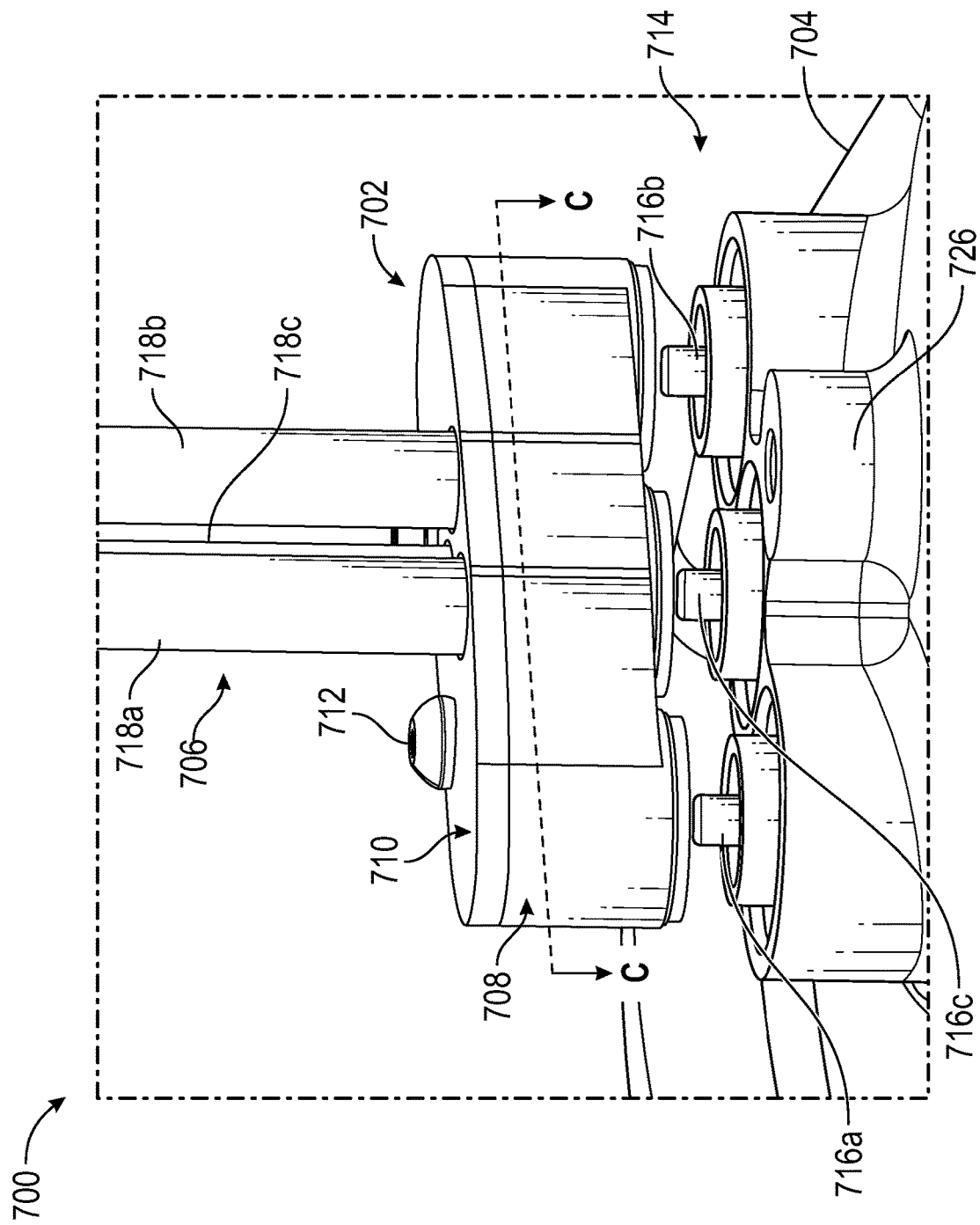
FIG. 7A is an isometric illustration of an adapter in accordance with an embodiment of the present disclosure shown relative to a generator housing to enable connection of an electrical conductor to an electric generator housed within the generator housing.
Figure 7C:
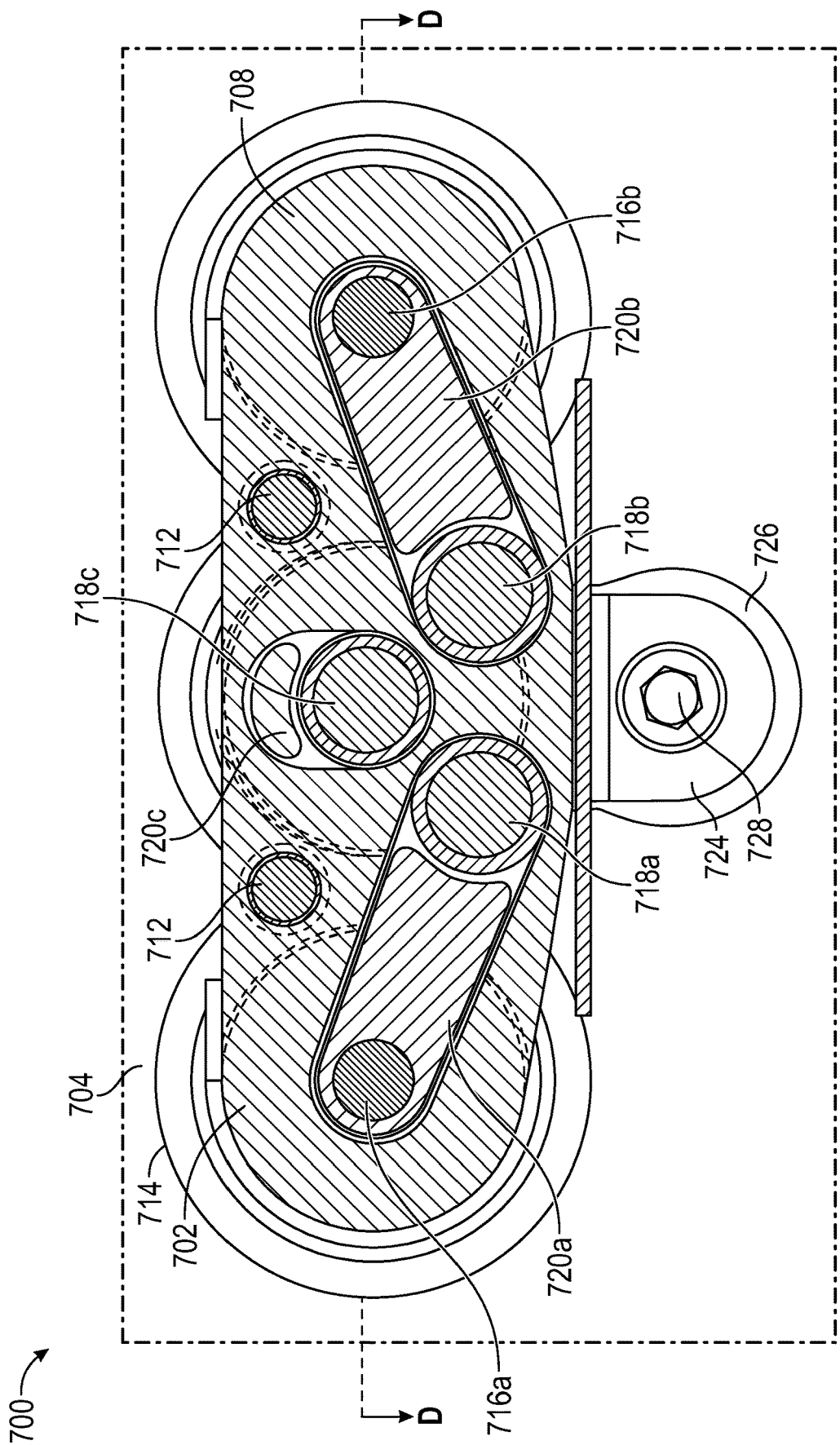
FIG. 7C illustrates a top down cross-sectional illustration of the adapter of FIG. 7A as viewed along the line C-C of FIG. 7A.

Turning now to FIGS. 7A-7D, schematic illustrations of a portion of a tail cone assembly 700 in accordance with an embodiment of the present disclosure are shown. FIG. 7A is an isometric illustration of an adapter 702 shown relative to a generator housing 704 to enable connection of an electrical conductor 706 to an electric generator housed within the generator housing 704. FIG. 7B illustrates a partial transparent illustration of the adapter 702 as connected to an electrical conductor 706 of the generator housing 704. FIG. 7C illustrates a top down cross-sectional illustration of the adapter 702 as viewed along the line C-C of FIG. 7A. FIG. 7D is a cross-sectional illustration of the adapter 702 as viewed along the line D-D of FIG. 7C. The tail cone assembly 700 may be similar to that shown and described above. The adapter 602 and the electrical conductor 706 may be configured to fit within an interior cavity of a hollow strut, such as shown above.

The adapter 702 includes an adapter body 708 and an adapter cover 710. The adapter cover 710 may be removably attached to the adapter body 708 by one or more fasteners 712. In this illustrative configuration, the electrical conductor 706 may pass through the adapter cover 710 to enable an electrical connection within the adapter 702, as described below. The adapter body 708 is configured to be installed to an electrical connector 714 of the generator housing 706. One or more electrical pins 716a, 716b, 716c are configured to extend from the electric generator and pass through the electrical connector 714 of the generator housing 706. The electrical conductor 706 includes respective wires 718a, 718b, 718c, which are configured to each electrically connect to one of the electrical pins 716a, 716b, 716c through an electrical connection within the adapter 702.

As shown in FIGS. 7B-7C, one or more bus bars 720a, 720b, 720c are arranged within the adapter 702 to provide an electrical connection between each wire 718a, 718b, 718c of the electrical conductor 706 and the electrical pins 716a, 716b, 716c. As such, an electrical connection can be achieved between the electrical conductor 706 and an electric generator within the generator housing 704. The adapter housing 708 and the adapter cover 710 may be made of an electrically insulating material such that the electrical paths through the adapter 702 is defined by respective sets of wires 718a, 718b, 718c, bus bars 720a, 720b, 720c, and electrical pins 716a, 716b, 716c. The electrical pins 716a, 716b, 716c may be supported within the electrical connector 714 by respective pin supports 722a, 722b, 722c, as shown in FIG. 7D.

The adapter 702 may be attached to or otherwise connected to the generator housing 702 by an attachment mechanism. In the illustrative embodiment of FIGS. 7A-7D, the attachment mechanism is provided by a bracket 724 that can be fastened to a bracket support 726 using one or more fasteners 728. As shown, the bracket 724 is a separate element from the adapter 702. In other embodiments, the bracket functionality may be integrated into one or both of the adapter body 708 and the adapter cover 710. Further, in some embodiments, the adapter body 708 may be formed to provide for a snap-connection or other direct connection between the adapter body and the generator housing and/or the electrical connector thereof.

Advantageously, embodiments of the present disclosure can enable improved electrical connection and power supply and distribution on an engine and/or aircraft. For example, embodiments described herein may enable installation of power sources within limited-access locations, such as tail cones of gas turbine engines. At the tail of gas turbine engines, the environment and installation limits the size and nature of components installed. As discussed above, a tail cone can be hollow and enable the installation of an electric generator therein. Embodiments described herein enable efficient electrical routing by using adapters and electrical connectors that allow for electrical conductors to be installed and pass through hollow struts that are arranged about the tail cone of the gas turbine engine.

In some embodiments, advantageously, a generator housing can be configured to multiple electrical connectors (e.g., terminal posts) that allow for electrical connection to an electric generator within the tail cone. The electrical connectors can be configured to electrical pins to provide three-phase electrical transmission, and thus three-phase can be distributed from the electric generator at multiple locations. Such multiple electrical connectors can improve power quality and reduce electromagnetic interference within the power system.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A tail cone assembly comprising:
    a tail cone;
    a generator housing having an electrical connector, the generator housing defining a longitudinal axis, the generator housing arranged within the tail cone;
    a first casing arranged radially outward from the generator housing relative to the longitudinal axis, the tail cone extending axially from the first casing;
    a second casing arranged radially outward from the first casing relative to the longitudinal axis;
    a hollow strut extending radially between the first casing and the second casing and defining an interior cavity, the hollow strut located circumferentially relative to the longitudinal axis at a location radially aligned with the electrical connector of the generator housing;
    an electrical conductor arranged within the interior cavity of the hollow strut; and
    an adapter configured to electrically connect the electrical conductor with the electrical connector of the generator housing, wherein the adapter is an elongate structure that fits within the interior cavity of the hollow strut.

2. The tail cone assembly of claim 1, further comprising an electric generator installed within the generator housing.

3. The tail cone assembly of claim 1, wherein the electrical conductor is a three-phase electrical conductor having three wires.

4. The tail cone assembly of claim 3, wherein:
    the electrical connector comprises three electrical pins; and
    the adapter comprises three bus bars arranged to each connect one of the three wires to one of the three electrical pins.

5. The tail cone assembly of claim 1, further comprising:
    at least one additional hollow strut extending radially between the first casing and the second casing and defining an interior cavity, the at least one additional hollow strut located circumferentially relative to the longitudinal axis at a location radially aligned with at least one additional electrical connector of the generator housing;
    at least one additional electrical conductor arranged within the interior cavity of the at least one additional hollow strut; and
    at least one additional adapter configured to electrically connect the at least one additional electrical conductor with the at least one additional electrical connector.

6. The tail cone assembly of claim 1, further comprising a bracket configured to fixedly attach the adapter to the generator housing.

7. The tail cone assembly of claim 1, wherein the adapter comprises an adapter body and an adapter cover.

8. The tail cone assembly of claim 7, wherein the adapter body is configured to directly connect to the generator housing.

9. The tail cone assembly of claim 7, wherein the adapter body and the adapter cover are electrically insulating.

10. A gas turbine engine comprising
    a low spool shaft arranged along an engine longitudinal axis; and
    a tail cone assembly comprising:
    a tail cone;
    a generator housing having an electrical connector, the generator housing defining a longitudinal axis aligned with the engine longitudinal axis, the generator housing arranged within the tail cone;
    a first casing arranged radially outward from the generator housing relative to the longitudinal axis, the tail cone extending axially from the first casing;
    a second casing arranged radially outward from the first casing relative to the longitudinal axis;
    a hollow strut extending radially between the first casing and the second casing and defining an interior cavity, the hollow strut located circumferentially relative to the longitudinal axis at a location radially aligned with the electrical connector of the generator housing;
    an electrical conductor arranged within the interior cavity of the hollow strut; and
    an adapter configured to electrically connect the electrical conductor with the electrical connector of the generator housing, wherein the adapter is an elongate structure that fits within the interior cavity of the hollow strut.

11. The gas turbine engine of claim 10, further comprising an electric generator installed within the generator housing, wherein the electric generator is operably connected to the low spool shaft.

12. The gas turbine engine of claim 10, wherein the electrical conductor is a three-phase electrical conductor having three wires.

13. The gas turbine engine of claim 10, further comprising a third casing arranged radially outward from the second casing relative to the longitudinal axis, wherein a space between the first casing and the second casing is a core flow exhaust area and a space between the second casing and the third casing is a bypass flow exhaust area.

14. The gas turbine engine of claim 10, further comprising:
    at least one additional hollow strut extending radially between the first casing and the second casing and defining an interior cavity, the at least one additional hollow strut located circumferentially relative to the longitudinal axis at a location radially aligned with at least one additional electrical connector of the generator housing;
    at least one additional electrical conductor arranged within the interior cavity of the at least one additional hollow strut; and
    at least one additional adapter configured to electrically connect the at least one additional electrical conductor with the at least one additional electrical conductor connector.

15. The gas turbine engine of claim 10, further comprising:
- at least one additional hollow strut extending radially between the first casing and the second casing and defining an interior cavity, the at least one additional hollow strut located circumferentially relative to the longitudinal axis at a location radially aligned with a fluid connector of the generator housing; and
- at least one fluid line connected to the fluid connector and passing through the at least one additional hollow strut.

16. The gas turbine engine of claim 15, wherein the at least one fluid line is one of an oil input line, an air input line, and an oil scavenge line.

17. The gas turbine engine of claim 10, further comprising a bracket configured to fixedly attach the adapter to the generator housing.

18. The gas turbine engine of claim 10, further comprising a tail cone arranged with the generator housing positioned within the tail cone.

* * * * *